United States Patent
Yamamoto et al.

(10) Patent No.: US 10,154,534 B2
(45) Date of Patent: Dec. 11, 2018

(54) TERMINAL DEVICE, BASE STATION DEVICE, COMMUNICATION SYSTEM, AND COMMUNICATION METHOD

(71) Applicant: KDDI CORPORATION, Shinjuku-ku (JP)

(72) Inventors: Toshiaki Yamamoto, Tokyo (JP); Takeo Ohseki, Tokyo (JP); Xiaoqiu Wang, Tokyo (JP); Yosuke Akimoto, Tokyo (JP); Satoshi Konishi, Tokyo (JP)

(73) Assignee: KDDI Corporation, Tokyo (JP)

( * ) Notice: Subject to any disclaimer, the term of this patent is extended or adjusted under 35 U.S.C. 154(b) by 186 days.

(21) Appl. No.: 14/760,237

(22) PCT Filed: Jan. 10, 2014

(86) PCT No.: PCT/JP2014/050308
§ 371 (c)(1),
(2) Date: Jul. 10, 2015

(87) PCT Pub. No.: WO2014/112437
PCT Pub. Date: Jul. 24, 2014

(65) Prior Publication Data
US 2015/0359031 A1    Dec. 10, 2015

(30) Foreign Application Priority Data

Jan. 17, 2013 (JP) ................... 2013-006570

(51) Int. Cl.
*H04W 4/00* (2018.01)
*H04W 76/18* (2018.01)
(Continued)

(52) U.S. Cl.
CPC ............. *H04W 76/18* (2018.02); *H04L 5/001* (2013.01); *H04L 5/0098* (2013.01);
(Continued)

(58) Field of Classification Search
None
See application file for complete search history.

(56) References Cited

U.S. PATENT DOCUMENTS

| | | | |
|---|---|---|---|
| 2009/0201810 A1* | 8/2009 | Kazmi | H04L 47/10 370/232 |
| 2010/0173626 A1* | 7/2010 | Catovic | H04W 76/18 455/423 |

(Continued)

FOREIGN PATENT DOCUMENTS

| | | |
|---|---|---|
| CN | 102340881 A | 2/2012 |
| CN | 102448079 A | 5/2012 |

(Continued)

OTHER PUBLICATIONS

U.S. Appl. No. 61/615,062, "Multiple Point Carrier Aggregation" by Liao.*

(Continued)

*Primary Examiner* — Kwang B Yao
*Assistant Examiner* — Juvena Loo
(74) *Attorney, Agent, or Firm* — Morgan, Lewis & Bockius LLP

(57) ABSTRACT

A terminal device includes a wireless communication part configured to wirelessly communicate with base station devices; a link controller configured to establish a link with a primary base station device (PCell) so as to enable a wireless communication via the wireless communication part while establishing a link with a secondary base station device (SCell) so as to enable a wireless communication via the wireless communication part; a primary base station link failure detector configured to detect a radio link failure in the wireless communication with the primary base station device based on the predetermined condition; and a primary base station link failure information transmitter configured to wirelessly transmit the information, concerning the radio (Continued)

link failure with the primary base station device, to the secondary base station device when the primary base station link failure detector detects the radio link failure status.

4 Claims, 4 Drawing Sheets

(51) Int. Cl.
*H04L 5/00* (2006.01)
*H04W 88/02* (2009.01)
*H04W 88/08* (2009.01)
*H04W 76/19* (2018.01)
*H04W 76/34* (2018.01)
*H04W 76/15* (2018.01)

(52) U.S. Cl.
CPC ............ *H04W 76/15* (2018.02); *H04W 76/19* (2018.02); *H04W 76/34* (2018.02); *H04W 88/02* (2013.01); *H04W 88/08* (2013.01)

(56) References Cited

U.S. PATENT DOCUMENTS

| | | | |
|---|---|---|---|
| 2010/0240359 A1* | 9/2010 | Wu | H04W 24/00 455/424 |
| 2011/0286327 A1* | 11/2011 | Chen | H04W 76/028 370/225 |
| 2012/0140743 A1* | 6/2012 | Pelletier | H04W 72/0453 370/335 |
| 2012/0202557 A1* | 8/2012 | Olofsson | H04W 24/08 455/525 |
| 2012/0250498 A1* | 10/2012 | Johansson | H04L 41/0604 370/221 |
| 2012/0281548 A1* | 11/2012 | Lin | H04W 76/18 370/242 |
| 2013/0072184 A1* | 3/2013 | Kusano | H04W 16/28 455/423 |
| 2013/0121167 A1* | 5/2013 | Wong | H04W 76/20 370/242 |
| 2013/0153298 A1* | 6/2013 | Pietraski | E21B 7/04 175/45 |
| 2013/0201947 A1* | 8/2013 | Wong | H04W 52/325 370/329 |
| 2013/0215734 A1* | 8/2013 | Asghar | H04W 24/02 370/216 |
| 2013/0250881 A1* | 9/2013 | Liao | H04W 36/08 370/329 |
| 2014/0112155 A1* | 4/2014 | Lindoff | H04W 24/08 370/242 |
| 2015/0223106 A1* | 8/2015 | Van Phan | H04L 29/14 370/225 |
| 2015/0249930 A1* | 9/2015 | Andrianov | H04W 24/08 455/423 |

FOREIGN PATENT DOCUMENTS

| | | | | |
|---|---|---|---|---|
| CN | 102761984 A | 10/2012 | | |
| CN | 102860078 A | 1/2013 | | |
| EP | 2086253 A1 * | 8/2009 | ........ | H04W 36/0055 |
| WO | 2011/100673 A1 | 8/2011 | | |
| WO | 2012-034588 A1 | 3/2012 | | |
| WO | 2012/111260 A1 | 8/2012 | | |
| WO | 2012/139798 A1 | 10/2012 | | |

OTHER PUBLICATIONS

Liu et al., "A 25 Gb/s(/km2) Urban Wireless Network Beyond IMT-Advanced", IEEE Communications Magazine, IEEE Service Center, Piscataway, US, vol. 49, No. 2, Feb. 1, 2011, pp. 122-129, XP011334686.
Pantech, "Analysis of the RLF in dual connectivity", 3GPP TSG-RAN WG2 Meeting #81bis, R2-131100, Chicago, USA, Apr. 15-19, 2013, XP050699421.
Catt et al., "RLM considerations for dual connectivity", 3GPP TSG RAN WG2 meeting #83bis, R2-133363, Ljubljana, Slovenia, Oct. 7-11, 2013, XP050719011.
Extended European Search Report dated Jul. 28, 2016, for corresponding European Application No. 14740481.8.
3GPP TS36.300 v11.3.0, E-UTRA and E-UTRAN overall description, Sep. 2012.
NTT DOCOMO Inc., Requirements, Candidate Solutions & Technology Roadmap for LTE Rel-12 Onward, 3GPP Workshop on Release 12 and onwards, RWS-120010, Jun. 11-12, 2012.
3GPP TS36.331 v11.1.0, E-UTRA RRC Protocol specification, Sep. 2012.
Pantech, Considerations on handling of SCell configuration at RLF, [online], 3GPP TSG RAN WG2 Meeting #72bis, Jan. 11, 2011, R2-110360, [retrieved on Jan. 22, 2014]. Retrieved on the Internet:<URL:http://www.3gpp.org/FTP/tsg_ran/WG2_RL2/TSGR2_72bis/Docs/R2-110360.zip>.
International Search Report dated Feb. 10, 2014, for International application No. PCT/JP2014/050308.
3rd Generation Partnership Project; Technical Specification Group Radio Access Network; Evolved Universal Terrestrial Radio Access Network (E-UTRAN); X2 Application Protocol (X2AP) (Release 9); Mar. 31, 2011, three pages.
3rd Generation Partnership Project; Technical Specification Group Radio Access Network; Evolved Universal Terrestrial Radio Access Network (E-UTRAN); X2 Application Protocol (X2AP) (Release 9); three pages.
Chinese Office Action dated Feb. 24, 2018 in related Chinese Patent Application No. 2014800045180 along with English translation of same.
Chinese Office Action dated Aug. 24, 2018 in corresponding Chinese Patent Application No. 201480004518.0 and partial translation of the search report.

* cited by examiner

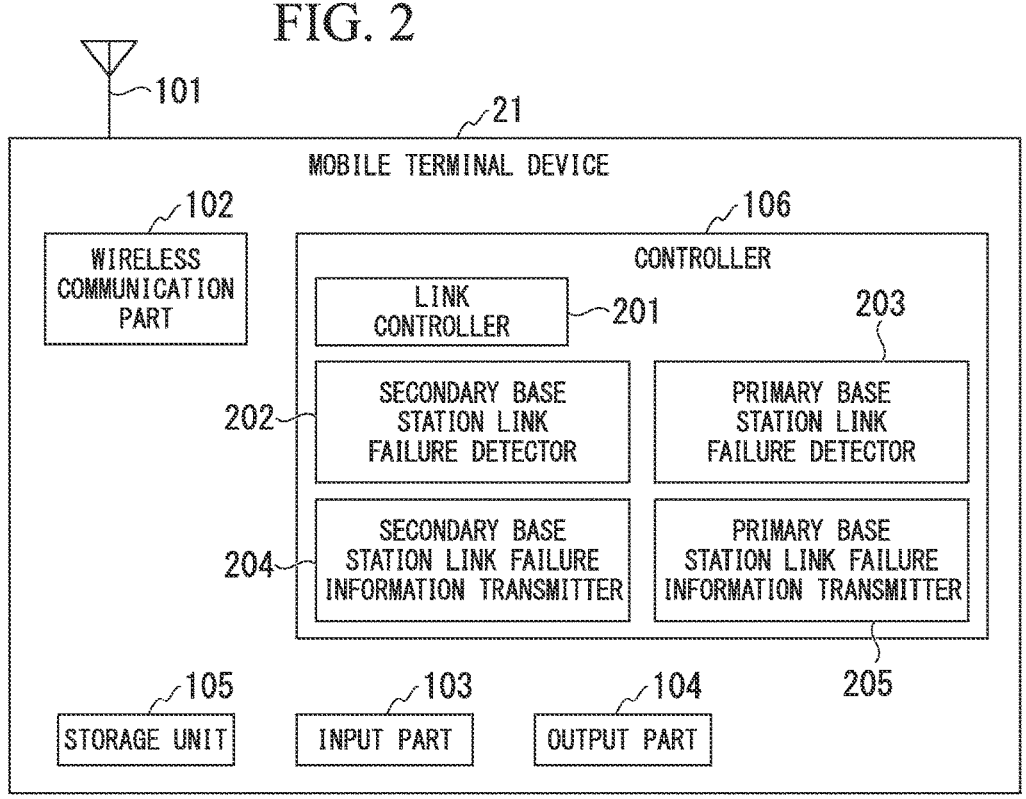
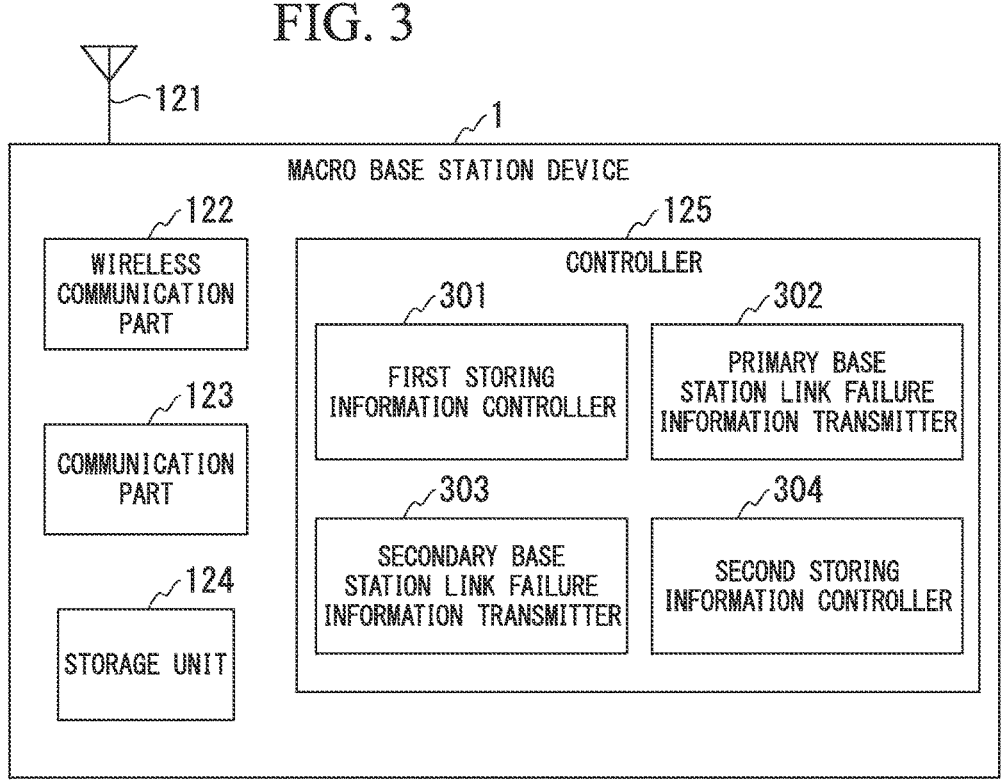

TERMINAL DEVICE, BASE STATION DEVICE, COMMUNICATION SYSTEM, AND COMMUNICATION METHOD

TECHNICAL FIELD

The present invention relates to a terminal device, a base station device, a communication system, and a communication method.

The present application claims priority on Japanese Patent Application No. 2013-6570 filed Jan. 17, 2013, the entire content of which is incorporated herein by reference.

BACKGROUND ART

The LTE-Advanced system studied by the 3GPP employs a carrier aggregation (CA) technology (see Non-Patent Literature Document 1) which can concurrently use a plurality of frequency bands (component carriers (CC)) for the purpose of improving frequency usage efficiencies and peak throughputs.

According to the inter-site carrier aggregation (Inter-Site CA) serving as one aspect of carrier aggregation, a mobile terminal device (UE: User Equipment) is concurrently connected to a plurality of base station devices (eNB: E-UTRAN Node B) located at different positions so as to communicate with those base station devices by use of different component carriers (CC).

Additionally, a network configuration has been provided to isolate a C-Plane (Control-Plane) and a U-Plane (User Plane) so as to transmit those planes using different base station devices during communications between base station devices and mobile terminal devices (Non-Patent Literature Document 2).

Herein, macro base stations covering macro cells are base station devices which can be expanded in broad areas in order to secure coverage of mobile terminal devices, wherein those base station devices may use carrier frequency bands such as 800-MHz band. Base station devices covering small cells are base station devices having small coverage, which can be located at various spots to expand capacities, wherein those base station devices may use high-frequency bands such as 3.4-GHz band.

Additionally, PCell (Primary Cell) refers to cells covered by base station devices configured to manage RRC (Radio Resource Control) connections between mobile terminal devices and base station devices according to carrier aggregation, while SCell (Secondary Cell) refers to cells covered by other base stations. Moreover, C-Plane is a protocol used to manage connections with mobile terminal devices while controlling mobility, while U-Plane is a protocol concerning reception and transmission of scheduling information and user traffic.

Moreover, the downlink (DL) indicates a direction of communicating data from a base station device to a mobile terminal device, while the uplink (UL) indicates a direction of communicating data from a mobile terminal device to a base station device.

CITATION LIST

Non-Patent Literature Document

Non-Patent Literature Document 1: 3GPP TS36.300 v11.3.0, "E-UTRA and E-UTRAN overall description", 2012-09

Non-Patent Literature Document 2: NTT DOCOMO INC., "Requirements, Candidate Solutions & Technology Roadmap for LTE Rel-12 Onward", 3GPP Workshop on Release 12 and onwards, RWS-120010, Jun. 11-12, 2012

Non-Patent Literature Document 3: 3GPP TS36.331 v11.1.0, "E-UTRA RRC Protocol specification", 2012-09

SUMMARY OF INVENTION

Technical Problem

FIG. 7 is a schematic drawing used to explain an example of a reconnection process after a radio link failure due to degradation of communication quality in PCell.

The communication system shown in FIG. 7 includes a macro base station device 1001-1, a small cell base station device 1002-1, and a mobile terminal device 1021-1. In FIG. 7, a base station network is configured such that the macro base station device 1001-1 covers a cell (a communication area) 1011-1 while the small cell base station device 1002-1 covers a cell (a communication area) 1012-1. In the example of FIG. 7, the cell 1012-1 of the small cell base station device 1002-1 is included in the cell 1011-1 of the macro base station device 1001-1.

It is assumed that the macro base station device 1001-1 serving as PCell carries out a C-Plane communication while the small cell base station device 1002-1 serving as SCell carries out a U-Plane communication in connection with the mobile terminal device 1021-1. The communication system carries out the following processes (1) to (3).

(1) When a radio link failure (or a communication breakdown) (P-1) occurs between the mobile terminal device 1021-1 and the PCell due to degradation of communication quality concerning the mobile terminal device 1021-1 and the PCell, a connection between the mobile terminal device 1021-1 and the base station network is broken irrespective of communication quality concerning the mobile terminal device 1021-1 and the SCell.

(2) The mobile terminal device 1021-1 carrying reconnection (P-2) of PCell resets (or breaks) a connect on of SCell during a reconnection process with PCell (P-3).

(3) Thus, the mobile terminal device 1021-1 needs to carry out again a reconnection process with SCell in order to carry out a communication with SCell.

According to (1), when a communication link between the mobile terminal device 1021-1 and PCell is broken (P-1) due to degradation of communication quality concerning the mobile terminal device 1021-1 and PCell, a connection between the mobile terminal device 1021-1 and the base station network is broken due to degradation of communication quality of SCell. According to (2), the mobile terminal device 1021-1 carries out a reconnection of PCell (P-2) but it resets a connection of SCell during a reconnection process with PCell (P-3).

For this reason, the PCell and the SCell are not provided with any methods for detecting a radio link failure with the mobile terminal device 1021-1 until a reconnection process is carried out according to (2) and (3) after a communication link between the mobile terminal device 1021-1 and PCell is broken according to (1), and therefore they are unable to lease resources used to manage the mobile terminal device 1021-1. This may raise a problem causing a reduction of network usage efficiency.

The present invention is created in consideration of the above circumstances, and therefore the present invention provides a terminal device, a base station device, a communication system, and a communication method which can improve network usage efficiency while releasing management information concerning unnecessary terminal devices.

Solution to Problem

To solve the above problem, the present invention is directed to a terminal device including: a wireless communication part configured to wirelessly communicate with primary and secondary base station devices; a link controller configured to establish a link so as to enable a wireless communication with the primary and secondary base station devices via the wireless communication part; a primary base station link failure detector configured to detect a radio link failure status in the wireless communication with the primary base station device based on the predetermined condition; and a primary base station link failure information transmitter configured to wirelessly transmit information, concerning a radio link failure with the primary base station device, via the wireless communication part when the primary base station link failure detector detects the radio link failure status.

The present invention is directed to a terminal device including: a wireless communication part configured to wirelessly communicate with primary and secondary base station devices; a link controller configured to establish a link so as to enable a wireless communication with the primary and secondary base station devices via the wireless communication part; a secondary base station link failure detector configured to detect a radio link failure status in the wireless communication with the secondary base station device based on the predetermined condition; and a secondary base station link failure information transmitter configured to wirelessly transmit information, concerning a radio link failure with the secondary base station device, to the primary base station device via the wireless communication part when the secondary base station link failure detector detects the radio link failure status.

The present invention is directed to a base station device, acting as a secondary base station device, including: a wireless communication part configured to wirelessly communicate with a terminal device; a storage unit configured to store information concerning the terminal device; and a first storing information controller configured to erase a part or the entirety of the information, concerning the terminal device, stored in the storage unit when the wireless communication part receives information concerning a radio link failure between the terminal device and a primary base station device.

The base station device of the present invention further includes a communication part configured to communicate with another base station device, and a primary base station link failure information transmitter configured to transmit information concerning a radio link failure to the primary base station device via the communication part when the wireless communication part receives the information concerning the radio link failure between the terminal device and the primary base station device.

The present invention is directed to a base station device, acting as a primary base station device, including: a wireless communication part configured to wirelessly communicate with a terminal device; a storage unit configured to store information concerning the terminal device; a communication part configured to communicate with another base station device; and a secondary base station link failure information transmitter configured to transmit information concerning a radio link failure with a secondary base station device to the secondary base station device via the communication part when the wireless communication part receives the information concerning the radio link failure between the terminal device and the secondary base station device.

The base station device of the present invention including the communication part further includes a second storing information controller configured to erase a part or the entirety of the information, concerning the terminal device, which is stored in the storage unit when the communication part receives the information, concerning the radio link failure with the terminal device, which is transmitted by another base station device.

The present invention is directed to a communication system including a terminal device as well as primary and secondary base station devices, wherein the terminal device establishes a link with the primary and secondary base station devices so as to enable a wireless communication, and wherein when the terminal device detects a radio link failure status in a wireless communication with the primary base station device or the secondary base station device based on the predetermined condition, the terminal device wirelessly transmits information, concerning the radio link failure with the primary base station device or the secondary base station device, to the primary base station device or the secondary base station device.

The present invention is directed to a communication method wherein a terminal device establishes a link with primary and secondary base station devices so as to enable a wireless communication, and wherein upon detecting a radio link failure status in a wireless communication with the primary base station device or the secondary base station device, the terminal device wirelessly transmits information, concerning the radio link failure with the primary base station device and the secondary base station device, to the primary base station device or the secondary base station device.

Advantageous Effects of Invention

According to the present invention, it is possible to improve network usage efficiency while releasing management information concerning unnecessary terminal devices.

BRIEF DESCRIPTION OF DRAWINGS

FIG. 2 is a block diagram showing a mobile terminal device according to one embodiment of the present invention.

FIG. 3 is a block diagram showing a macro base station device according to one embodiment of the present invention.

DESCRIPTION OF EMBODIMENTS

Hereinafter, one embodiment of the present invention will be described with reference to the drawings.

<Configuration of Communication System According to Present Embodiment>

The communication system of the present embodiment is designed to receive or transmit C-Plane data via PCell but to receive or transmit U-Plane data via any one of PCell and SCell or via both of them. In the communication system of the present invention, it is assumed that macro base station devices and small cell base station devices can be connected to any mobile terminal devices as PCell or SCell.

Figure 1:
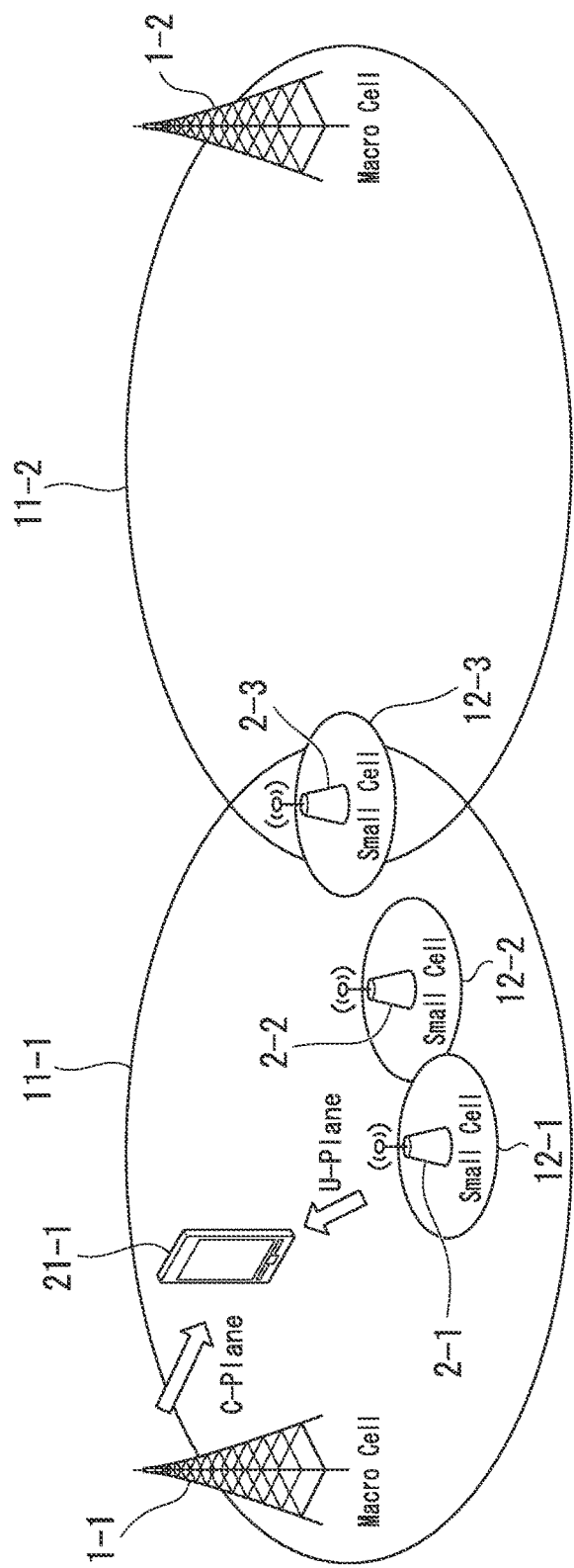
FIG. 1 is a block diagram showing a communication system according to one embodiment of the present invention.

FIG. 1 is a block diagram showing a schematic configuration of a communication system according to one embodiment of the present invention.

The communication system of the present embodiment includes a plurality of (e.g. two in FIG. 1) macro base station devices 1-1 and 1-2, a plurality of (e.g. three in FIG. 1) small cell base station devices 2-1 to 2-3, and a plurality of (e.g. one shown in FIG. 1) of mobile terminal devices (i.e. an example of terminal devices) 21-1. Additionally, FIG. 1 shows cells (communication areas) 11-1 and 11-2 for the macro base station devices 1-1 and 1-2 and cells (communication areas) 12-1 to 12-3 for the small cell base station devices 2-1 to 2-3.

In FIG. 1, the cells 12-1 and 12-2 of the small cell base station devices 2-1 and 2-2 are included in the cell 11-1 of the macro base station device 1-1, while the cells 11-1 and 11-2 of the two macro base station devices 1-1 and 1-2 and the cell 12-3 of the small cell base stat on device 2-3 share the mutually overlapped area.

It is assumed that the macro base station device 1-1 serving as PCell communicates C-Plane data (signals) while the small cell base station device 2-1 serving as SCell communicates U-Plane data (signals) in connection with the mobile terminal device 21-1.

In the present embodiment, the macro base station devices 1-1, 1-2 and the small cell base station devices 2-1 to 2-3 are connected together so as to directly or indirectly communicate with each other. As communications, for example, it is possible to use wired communications or wireless communications.

In the communication system of the present embodiment, the mobile terminal device 21-1 is able to concurrently carry out communications with the macro base station devices 1-1, 1-2 and the small cell base station devices 2-1 to 2-3 via C/U isolation.

In this connection, the communication system may use arbitrary numbers as the number of macro base station devices, the number of small cell base station devices, and the number of mobile terminal devices.

<Configuration of Mobile Terminal Device According to Present Embodiment>

FIG. 2 is a block diagram showing a schematic configuration of a mobile terminal device according to one embodiment of the present invention. In the present embodiment, all the mobile terminal devices have the same configuration to carry out the same operation; hence, they will be collectively referred to as a mobile terminal device 21.

The mobile terminal device 21 of the present embodiment includes an antenna 101, a wireless communication part 102 an input part 103 an output part 104, a storage unit 105, and a controller 106.

The controller 106 further includes a connection controller 201, a secondary base station link failure detector 202, a primary base station link failure detector 203, a secondary base station link failure information transmitter 204, and a primary base station link failure information transmitter 205.

The antenna 101 communicates (i.e. receives or transmits) wireless signals. The wireless communication part 102 processes transmission signals so as to wirelessly transmit them via the antenna 101, while the wireless communication part 102 processes wireless signals received via the antenna 101. For example, the wireless communication part 102 carries out wireless communications with base station devices (i.e. the macro base station devices 1-1, 1-2 and the small cell base station devices 2-1 to 2-3 in the present embodiment).

The input part 103 inputs external data. For example, the input part 103 includes an operator configured to receive a user's operation. For example, the operator can be configured of a touch panel or a key. For example, the input part 103 includes an audio input part configured to input external sound (e.g. a voice). For example, the input part includes a data input part configured to input data from an external memory device or an external device.

The output part 104 outputs data externally. For example, the output part 104 includes a display configured to display information on screen. For example, the display is configured of a liquid-crystal screen. For example, the output part 104 includes an audio output part configured to output sound (e.g. a voice) externally. For example, the output part 104 includes a data output part configured to output data to an external memory device or an external device.

The storage unit 105 stores various types of information. For example, the storage unit 105 is configured of a memory device. For example, the storage unit 105 stores programs being processed by a processor such as the controller 106. The controller 106 carries out various types of processes or controls.

By using the wireless communication part 102, the connection control part 201 is connected to the primary party serving as a base station device (e.g. PCell in the present embodiment) enabling a wireless communication, while it is connected to the secondary party serving as a base station device (e.g. SCell in the present embodiment) enabling a wireless communication (hereinafter, the primary party serving as a base station will be referred to as a primary base station while the secondary party serving as a base station will be referred to as a secondary base station).

The primary base station link failure detector 203 detects a radio link failure (RLF in the present embodiment) status in a wireless communication with the primary base station device based on the predetermined condition.

When the primary base station link failure detector 203 detects a radio link failure status, the primary base station link failure information transmitter 205 wirelessly transmits the information concerning a radio link failure with the primary base station device to the secondary base station device via the wireless communication part 102.

The secondary base station link failure detector 202 detects a radio link failure (RLF in the present embodiment) status in a wireless communication with the secondary base station device based on the predetermined condition.

When the secondary base station link failure detector 202 detects a radio link failure status, the secondary base station link failure information transmitter 204 wirelessly transmits the information concerning a radio link failure with the secondary base station device to the primary base station device via the wireless communication part 102.

<Configuration of Macro Base Station Device According to Present Embodiment>

FIG. 3 is a block diagram showing the configuration of a macro base station device according to one embodiment of the present invention. In the present embodiment, all the macro base station devices have the same configuration so as to carry out the same operation; hence, they will be collectively referred to as a macro base station device 1.

The macro base station device 1 of the present embodiment includes an antenna 121, a wireless communication part 122, a communication part 123, a storage unit 124, and a controller 125. The controller 125 includes a first storing information controller 301, a primary base station link failure information transmitter 302, a secondary base station link failure information transmitter 303, and a second storing information controller 304.

The antenna 121 communicates (i.e. receives or transmits) wireless signals. The wireless communication part 122 processes a transmission signal so as to wirelessly transmit the transmission signal via the antenna 121, while it processes a wireless signal received by the antenna 121. For example, the wireless communication part 122 carries out a wireless communication with the mobile terminal device 21-1. The communication part 123 communicates (i.e. receives or transmits) information with other base station devices (macro base station devices and small cell base station devices). For example, this communication can be carried out using a wired line, or it can be carried out using a wireless line.

The storage unit 124 stores various types of information. For example, the storage unit 124 is configured of a memory device. For example, the storage unit 124 stores programs being processed by a processor such as the controller 125. For example, the storage unit 124 stores the information (e.g. management information) concerning the mobile terminal device 21-1, which is connected to the macro base station device 1 enabling a wireless communication. The controller 125 carries out various processes and controls.

The mobile terminal device 21-1 transmits information concerning a radio link failure with the primary base station device to the wireless communication part 122 due to the occurrence of a radio link failure between the mobile terminal device 21-1 and the primary base station device when the macro base station device 1 serving as a secondary base station device enabling a wireless communication is connected to the mobile terminal device 21-1.

Upon receiving the information concerning a radio link failure, the first storing information controller 301 erases a part or the entirety of the information, concerning the mobile terminal device 21-1, stored in the storage unit 124.

Upon receiving the information concerning a radio link failure between the mobile terminal device 21-1 and the primary base station device, the primary base station link failure information transmitter 302 transmits the information concerning a radio link failure to the primary base station device via the communication part 123.

When the wireless communication part 122 receives the information, concerning a radio link failure with the primary base station device, which is wirelessly transmitted by the mobile terminal device 21-1 connected to the local device (i.e. the macro base station device 1) serving as a secondary base station device enabling a wireless communication, the first storing information controller 301 erases a part or the entirety of the information, concerning the mobile terminal device 21-1, which is stored in the storage unit 124.

When the wireless communication part 122 receives the information, concerning a radio link failure with the primary base station device, which is wirelessly transmitted by the mobile terminal device 21-1 connected to the local device (i.e. the macro base station device 1) serving as a secondary base station device enabling a wireless communication, the primary base station link failure information transmitter 302 transmits the information, concerning a radio link failure with the primary base station device, to the primary base station device via the communication part 123.

The mobile terminal device 21-1 transmits the information, concerning a radio link failure with the secondary base station device, to the wireless communication part 122 due to the occurrence of a radio link failure between the mobile terminal device 21-1 and the secondary base station device when the mobile terminal device 21-1 is connected to the macro base station device 1 serving as a primary base station device enabling a wireless communication.

Upon receiving the information, concerning a radio link failure between the mobile terminal device 21-1 and the secondary base station device, the secondary base station link failure information transmitter 303 transmits the information concerning a radio link failure to the secondary base station device via the communication part 123.

When the wireless communication part 122 receives the information, concerning a radio link failure with the secondary base station device, which is wirelessly transmitted by the mobile terminal device 21-1 connected to the local device (i.e. the macro base station device 1) enabling a wireless communication, the secondary base station link failure information transmitter 303 transmits the information, concerning a radio link failure with the secondary base station device, to the secondary base station device via the communication part 123.

Upon receiving the information, concerning a radio link failure between the mobile terminal device 21-1 and the local device (i.e. the macro base station device 1), which is transmitted by another base station device, the second storing information controller 304 erases a part or the entirety of the information, concerning the mobile terminal device 21-1, which is stored in the storage unit 124.

<Configuration of Small Cell Base Station Device According to Present Embodiment>

Figure 4:
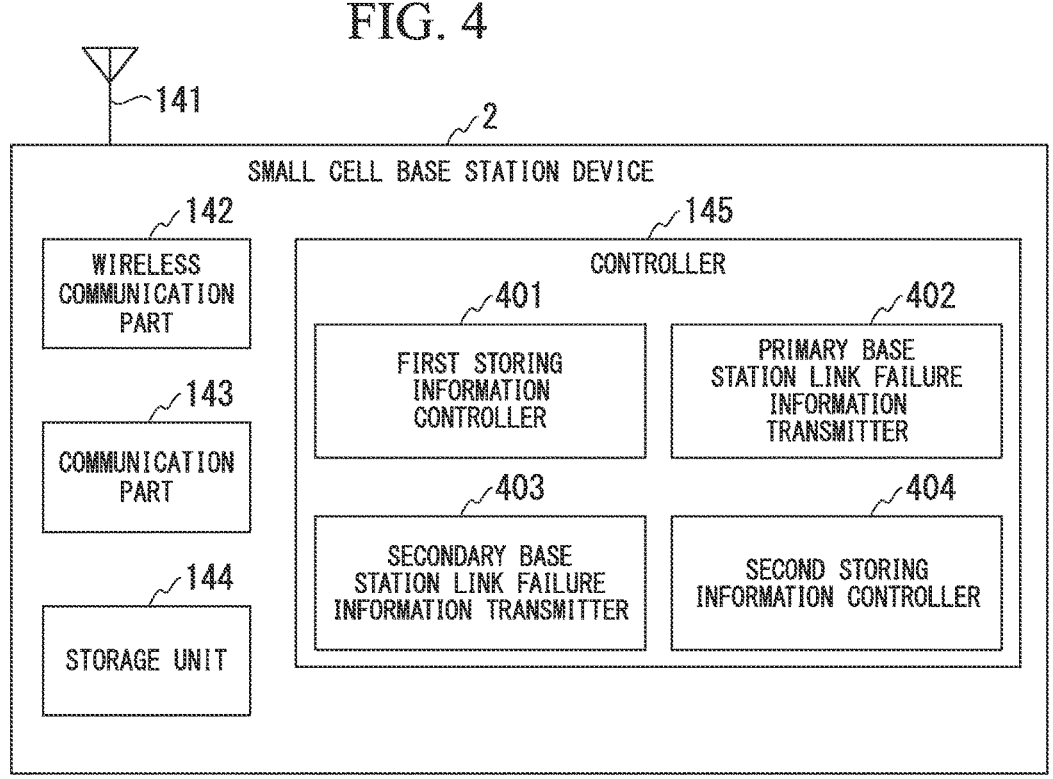
FIG. 4 is a block diagram showing a small cell base station device according to one embodiment of the present invention.

FIG. 4 is a block diagram showing the configuration of a small cell base station device according to one embodiment of the present invention. In the present embodiment, all the small cell base station devices have the same configuration so as to carry out the same operation; hence, they will be collectively referred to as a small cell base station device 2.

The small cell base station device 2 of the present embodiment includes an antenna 141, a fireless communication part 142, a communication part 143, a storage unit 144, and a controller 145. The controller 145 further includes a first storing information controller 401, a primary base station link failure information transmitter 402, a secondary base station link failure information transmitter 403, and a second storing information controller 404.

The antenna 141 communicates (i.e. receives or transmits) wireless signals. The wireless communication part 142 processes a transmission signal so as to transmit the transmission signal via the antenna 141, while it processes a wireless signal received by the antenna 141. For example, the wireless communication part 142 wirelessly communicates with the mobile terminal device 21-1.

The communication part 143 communicates (i.e. receives or transmits) information with other base station devices (e.g. macro base station devices and small cell base station devices). For example, this communication can be carried out using a wired line or a wireless line.

The storage unit 144 stores various types of information. For example, the storage unit 144 is configured of a memory device. For example, the storage unit 144 stores programs being processed by a processor such as the controller 145. For example, the storage unit 144 stores the information (e.g. the management information) concerning the mobile terminal device 21-1, which is connected to the small cell base station device 2 enabling a wireless communication. The controller 145 carries out various processes and controls.

When the wireless communication part 142 receives the information, concerning a radio link failure with the primary base station device, which is wirelessly transmitted by the mobile terminal device 21-1 connected to the local device (i.e. the small cell base station device 2) serving as a secondary base station device enabling a wireless communication, the first storing information controller 401 erases a part or the entirety of the information, concerning the mobile terminal device 21-1, which is stored in the storage unit 144.

When the wireless communication part 142 receives the information, concerning a radio link failure with the primary base station device, which is wirelessly transmitted by the mobile terminal device 21-1 connected to the local device (i.e. the small cell base station device 2) serving as a secondary base station device enabling a wireless communication, the primary base station link failure information transmitter 402 transmits the information, concerning a radio link failure with the primary base station device, to the primary base station device via the communication part 143.

When the wireless communication part 142 receives the information, concerning a radio link failure with the secondary base station device, which is wirelessly transmitted by the mobile terminal device 21-1 connected to the local device (i.e. the small cell base station device 2) enabling a wireless communication, the secondary base station link failure information transmitter 403 transmits the information, concerning a radio link failure with the secondary base station device, to the secondary base station device via the communication part 143.

When the communication part 143 receives the information, concerning a radio link failure between the mobile terminal device 21-1 and the local device (i.e. the small cell base station device 2), which is transmitted by another base station device, the second storing information controller 404 erases a part or the entirety of the information, concerning the mobile terminal device 21-1, which is stored in the storage unit 144.

<Processing of Communication System According to Present Embodiment>

Figure 5:
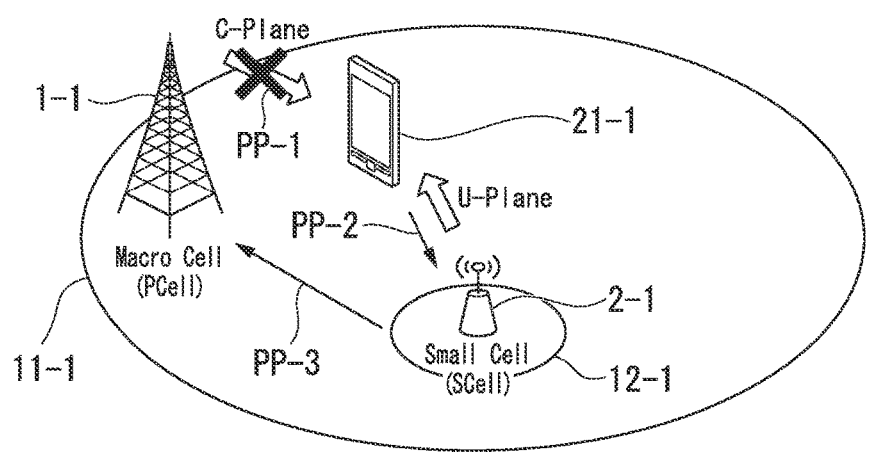
FIG. 5 is a schematic drawing used to explain processes that are carried out upon detecting a radio link failure between a mobile terminal device and a primary base station in the communication system according to one embodiment of the present invention.

FIG. 5 is a schematic drawing used to explain an example of processing (i.e. a process of notifying a radio link failure to the SCell and the PCell) which is carried out by the communication system according to one embodiment of the present invention.

FIG. 5 shows the configuration used to explain the above process, including a macro base station device 1-1, a small cell base station device 2-1, and a mobile terminal device 21-1 as well as a cell 11-1 of the macro base station device 1-1 and a cell 12-1 of the small cell base station device 2-1.

It is assumed that the macro base station device 1-1 serving as PCell communicates C-Plane data (signals) while the s all cell base station device 2-1 serving as SCell communicates U-Plane data (signals) in connection with the mobile terminal device 21-1.

Roughly speaking, in the communication system of the present embodiment, the mobile terminal device 21-1 notifies SCell, with which a connection has been already established, of a radio link failure with PCell upon detecting a radio link failure with PCell, thus releasing the management information of the mobile terminal device 21-1 (which is stored in SCell. Additionally SCell may notify PCell of the information concerning a radio link failure via a line, thus releasing the management information of the mobile terminal device 21-1 (which is stored in PCell) in PCell.

In this connection, it is possible to use an X2 line or an S1 line as a line interconnecting between base station devices (i.e. SCell and PCell).

Specifically, the communication system of the present embodiment carries out the following processes (1)-(3).

(1) The mobile terminal device 21-1 detects (or senses) a radio link failure (RIF) with PCell (i.e. the macro base station device 1-1 in this stage) by way of the primary base station link failure detector 203 (PP-1)

In particular, no limitation is required with respect to methods of detecting RLF between the mobile terminal device 21-1 and PCell. For example, it is possible to use the RLF determination method which is described in Non-Patent Literature Document 3, 5.3.11.3 Detection of radio link failure. Without directly introducing RLF, it is possible to interpret the occurrence of RLF based on the channel quality information (CQI: Channel Quality Indication) equal to below a certain value.

The mobile terminal device 21-1 monitors a communication link status with SCell (i.e. the small cell base station device 2-1 in this stage), and therefore the secondary base station link failure detector 202 detects the occurrence of a radio link failure (RLF) with SCell.

In particular, no limitation is required with respect to methods of detecting RLF between the mobile terminal device 21-1 and SCell. For example, it is possible for SCell to adopt the RLF determination method described in Non-Patent Literature Document 3, 5.3.11.3 Detection of radio link failure.

Specifically, the mobile terminal device 21-1 determines the occurrence of RLF with SCell when it determines that any one or more of three conditions is satisfied (see details of Non-Patent Literature Document 3).

<First Condition of Determining the Occurrence of RLF>

The mobile terminal device 21-1 monitors in-sync and out-of-sync with respect to reception power concerning a wireless communication with SCell, thus determining that the condition (i.e. the first condition) is satisfied at the expiration of a time T310.

<Second Condition of Determining the Occurrence of RLF>

The mobile terminal device 21-1 checks times T300, T301, T304, and T311 with respect to SCell, thus determining that the condition (i.e. the second condition) is satisfied when a random access procedure fails in MAC (Medium Access Control) during the operation of any one of timers.

<Third Condition of Determining the Occurrence of RLF>

The mobile terminal device 21-1 determines that the condition (i.e. the third condition) is satisfied upon reaching the maximum number of times in retransmitting RLC (Radio Link Control) in SCell.

In the present embodiment, the mobile terminal device 21-1 does not need to carry out a reconnection process (i.e.

RRC connection re-establishment) with PCell when RLF does not occur with SCell (see Non-Patent Literature Document 3, 5.3.3 RRC connection establishment).

When the mobile terminal device 21-1 is connected to a plurality of SCells, the mobile terminal device 21-1 monitors a communication status with respect to all the SCells, and therefore it does not need to carry out a reconnection process with PCell unless RFL concurrently occurs with all the SCells connected thereto (that is, unless RLF does not occur with one or more SCells).

(2) The mobile terminal device 21-1 notifies SCell of the information concerning a radio link failure with PCell by means of the primary base station link failure information transmitter 205 (PP-2). Alternatively, the mobile terminal devices 21-1 may notify SCell of a radio link failure with PCell by means of the primary base station link failure information transmitter 205 only when RLF does not occur with SCell. The mobile terminal device 21-1 incorporates a mobile terminal management number (C-RNTI: Cell-Radio Network Temporary Identifier) of PCell into a notice signal (or a message). Herein, it is possible to set the aribitrary timing of making a notice (e.g. the timing of the mobile terminal device 21-1 transmitting a notice signal). For example, it is possible to set the immediate timing or to set the timing after lapse of a certain time (or the predetermined time).

The SCell receiving the information concerning a radio link failure with PCell releases (or erases) the management information of the mobile terminal device 21-1 (i.e. the management information concerning the mobile terminal device 21-1) in SCell by means of the first storing information controller (i.e. the first storing information controller 401 of the small cell base station device 2-1).

(3) The SCell receiving the information concerning a radio link failure with PCell notifies PCell with the information concerning a radio link failure through a line by means of the primary base station k failure information transmitter (i.e. the primary base station link failure transmitter 402 of the small cell base station device 2-1) (PP-3). The SCell incorporates the mobile terminal management number (C-RNTI) of PCell into a notice signal (or a message) with respect to the mobile terminal device 21-1 undergoing a radio link failure. Herein, it is possible to set the arbitrary timing of making a notice (e.g. the timing of SCell transmitting a notice signal). For example, it is possible to set the immediate timing or the timing after a lapse of a certain time (or the predetermined time).

The PCell receiving the information concerning a radio link failure PCell releases (or erases) the management information of the mobile terminal device 21-1 of PCell (i.e. the management information concerning the mobile terminal device 21-1) by means of the second storing information controller (i.e. the second storing information controller 304 of the macro base station device 1-1).

The above process of notifying a radio link failure to Scell and PCell shown in FIG. 5 can be carried out upon detecting a radio link failure between the mobile terminal device 21-1 and SCell.

Figure 6:
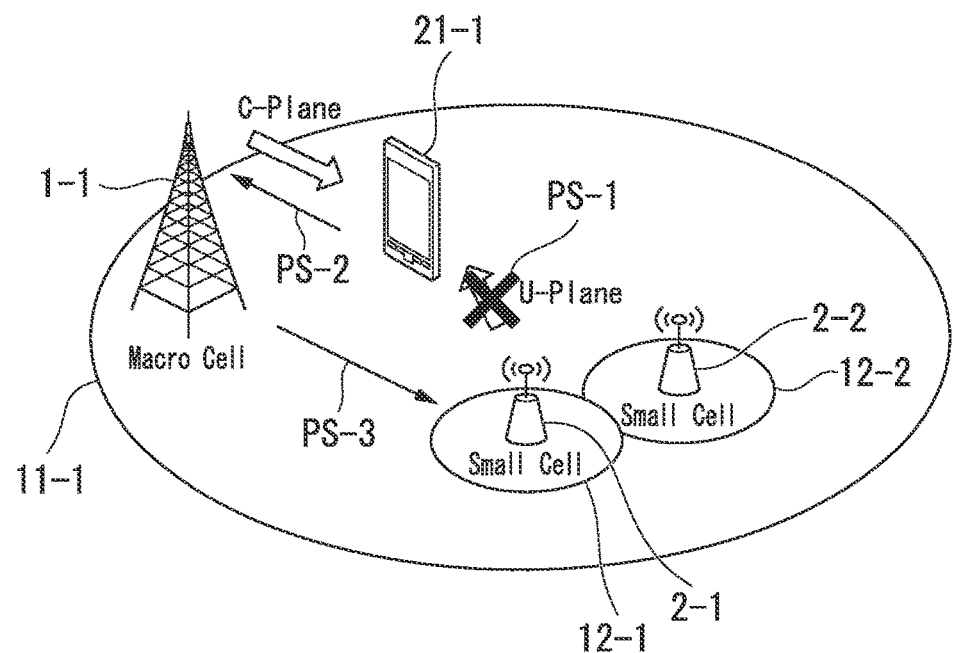
FIG. 6 is a schematic drawing used to explain processes that are carried out upon detecting a radio link failure between a mobile terminal device and a secondary base station in the communication system according to one embodiment of the present invention.
Figure 7:
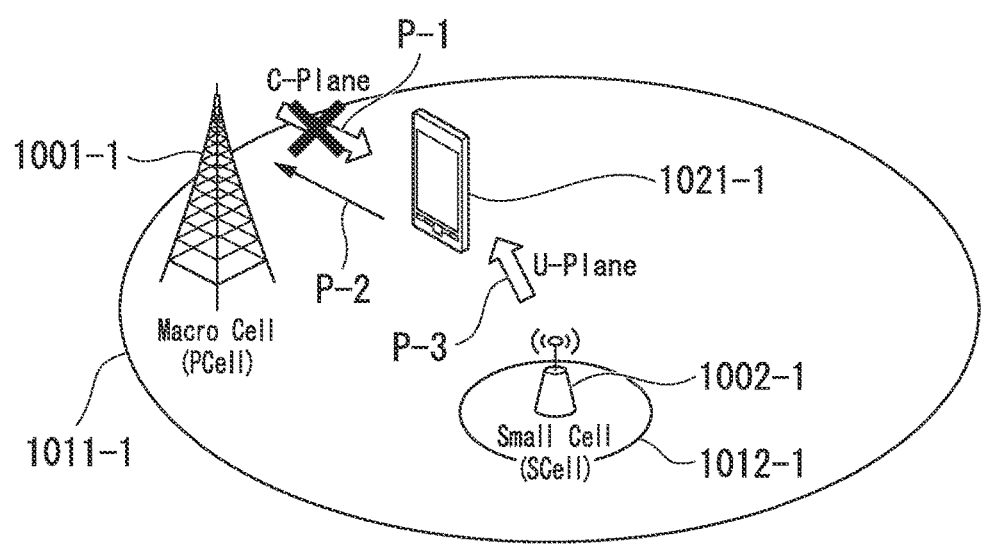
FIG. 7 is a schematic drawing used to explain a reconnection process after a radio link failure due to degradation of communication quality of PCell in the conventional communication system.

FIG. 6 is a schematic drawing used to explain an example of processing (i.e. a process of notifying a radio link failure to SCell and PCell) which is carried out by the communication system according to one embodiment of the present invention.

FIG. 6 shows the configuration used to explain the above process, including a macro base station device 1-1, small cell base station devices 2-1, 2,2, and a mobile terminal device 21-1 as well as a cell 11-1 of the macro base station device 1-1 and cells 12-1, 12-2 of the small cell base station devices 2-1, 2-2.

It is assumed that the macro base station device 1-1 serving as PCell communicates C-Plane data (or signals) while the small cell base station device 2-1 serving as SCell communicates U-Plane data (or signals) in connection with the mobile terminal device 21-1.

Roughly speaking, in the communication system of the present embodiment, the mobile terminal device 21-1 notifies PCell, with which a link has been already established, of a radio link failure with SCell upon detecting a radio link failure with SCell, thus releasing the management information of the mobile terminal device 21-1 of PCell (i.e. the information stored in PCell). For example, PCell may notify SCell of the information concerning a radio link failure through a line, thus releasing the management information of the mobile terminal device 21-1 of SCell (i.e. the information stored in SCell).

In this connection, it is possible to use an X2 line or an S1 line as a line interconnecting between base station devices (i.e. SCell and PCell).

Specifically, the communication system of the present embodiment (carries out the processes (1)-(3) as follows.

(1) The mobile terminal device 21-1 monitors a communication link status with SCell (i.e. the small cell base station device 2-1 at this stage), thus detecting the occurrence of a radio link failure (RLF) with SCell by means of the secondary base station link failure detector 202 (PS-1).

In particular, no limitation is required with respect to methods of detecting RlF between the mobile terminal device 21-1 and SCell. For example, it is possible for SCell to adopt the RLF determination method described in Non-Patent Literature Document 3, 5.3.11.3 Detection of radio link failure.

Specifically, the mobile terminal device 21-1 determines the occurrence of RLF with SCell when it determines that any one or more of three conditions is satisfied (see details of Non-Patent Literature Document 3).

<First Condition of Determining the Occurrence of RLF>

The mobile terminal device 21-1 monitors in-sync and out-of-sync with respect to reception power concerning a wireless communication with SCell, and therefore it determines that the condition (i.e. the first condition) is satisfied at the expiration of a time T310.

<Second Condition of Determining the Occurrence of RLF>

The mobile terminal device 21-1 checks times T310, T301, T304, and T311 with respect to SCell, and therefore it determines that the condition (i.e. the second condition) is satisfied when MAC fails a random access procedure during the operation of any one of timers.

<Third Condition of Determining the Occurrence of RLF>

The mobile terminal device 21-1 determines that the condition (i.e. the third condition) is satisfied upon reaching the maximum number of times in retransmitting RLC with SCell.

(2) The mobile terminal device 21-1 notifies PCell of the information concerning a radio link failure with SCell by means of the secondary base station link failure information transmitter 204 (PS-2). The mobile terminal device 21-1 incorporates the mobile terminal management number (C-RNTI) of SCell into a notice signal (or a message). Herein, it is possible to set the arbitrary timing of making a notice (e.g. the timing of the mobile terminal device 21-1 transmitting a notice signal). For example, it is possible to set the immediate timing or the timing after a lapse of a certain time (or the predetermined time).

(3) Upon receiving the information concerning a radio link failure with SCell, PCell notifies SCell of the information concerning a radio link failure through a line by means of the secondary base station link failure transmitter (i.e. the secondary base station link failure transmitter 303 of the macro base station device 1-1) (PS-3). The PCell incorporates the mobile terminal management number (C-RNTI) of SCell into a notice signal (or a message).

Herein, it is possible to set the arbitrary timing making a notice (e.g. the timing of PCell transmitting a notice signal). For example, it is possible to set the immediate timing or the timing after a lapse of a certain time (or the predetermined time).

Upon receiving the information concerning a radio link failure with SCell, SCell releases (or erases) the management information of the mobile terminal device 21-1 of SCell (i.e. the management information concerning the mobile terminal device 21-1) by means of the second storing information controller (i.e. the second storing information controller 404 of the small cell base station device 2-1).

<Conclusion of Configuration and Effect of Present Embodiment>

As described above, the communication system of the present embodiment, involving the configuration in which the mobile terminal device 21-1 can be concurrently connected to a plurality of base station devices 1-1, 2-1 so as to carry out wireless communications, is designed to notify another base station device (i.e. SCell in the present embodiment), with which a link has been already established, of a link failure with a base station network upon detecting a radio link failure with the base station device (i.e. PCell in the present embodiment) managing a linkage with the base station network and then to release the management information of the mobile terminal device 21-1 which is not required in the base station network, thus improving the network usage efficiency.

In the communication system of the present embodiment, the mobile terminal device 21-1 monitors communication quality (e.g. reception power) with SCell so as to determine a radio link failure (RLF).

The communication system of the present embodiment does not carry out a reconnection process (i.e. RRC connection re-establishment) between the mobile terminal device 21-1 and PCell when an RLF does not occur in a communication between the mobile terminal device 21-1 and SCell although the mobile terminal device 21-1 detects an REF with PCell.

In this case, when the mobile terminal device 21-1 is connected to a plurality of SCells, the communication system does not carry out a reconnection process (i.e. RRC connection re-establishment) between the mobile terminal device 21-1 and PCell unless an RLF occurs in all the communications with SCells.

In the communication system of the present embodiment, the mobile terminal device 21-1 detecting an RIF with PCell notifies SCell of a signal (or a message), concerning a radio link failure with PCell, including the mobile terminal management number (C-RNTI) of PCell.

In the communication system of the present embodiment, SCell receiving a signal (or a message) concerning a radio link failure between the mobile terminal device 21-1 and PCell releases the management information concerning the mobile terminal device 21-1 in SCell.

In the communication system of the present embodiment, SCell receiving a signal (or a message) concerning a radio link failure between the mobile terminal device 21-1 and PCell notifies PCell of a signal (or a message), concerning a radio link failure with PCell, including the mobile terminal management number (C-RNTI) of PCell through a backbone line (e.g. an X2 line or an S1 line).

In the communication system of the present embodiment, PCell receiving a signal (or a message) concerning a radio link failure between the mobile terminal device 21-1 and PCell releases the management information concerning the mobile terminal device 21-1 in PCell.

In the communication system of the present embodiment, the mobile terminal device 21-1, detecting a radio link failure with SCell by way of the RLF determination, notifies PCell of a signal (or a message), concerning a radio link failure with SCell, including the mobile terminal management number (C-RNTI) of SCell.

In the communication system of the present embodiment, PCell, receiving a signal (or a message) concerning a radio link failure between the mobile terminal device 21-1 and SCell, notifies SCell of a signal (or a message), concerning a radio link failure with SCell, including the mobile terminal management number (C-RNTI) of SCell through a backbone line (e.g. an X2 line or an S1 line).

In the communication system of the present embodiment, SCell, receiving a signal (or a message) concerning a radio link failure between the mobile terminal device 21-1 and SCell, releases the management information concerning the mobile terminal device 21-1 in SCell.

As described above, the communication system of the present embodiment notifies a radio link failure in such a way that the mobile terminal device 21-1 determines a radio link failure with the base station device so as to notify the radio link failure to the base station network it real time, and therefore the communication system (immediately) releases the unnecessary management information concerning the mobile terminal device, thus improving the network usage efficiency.

[Examples of Configurations of Foregoing Embodiments]

The foregoing embodiments can be described using the following configurations.

A terminal device (i.e. the mobile terminal device 21-1 in the foregoing embodiments) includes: a wireless communication part. (i.e. the wireless communication part 102 in the foregoing embodiments) configured wirelessly communicate with base station devices (i.e. the macro base station devices 1-1, 1-2, and the small cell base station devices 2-1 to 2-3 in the foregoing embodiments); a link controller (i.e. the link controller 201 in the foregoing embodiments) configured to establish a link so as to enable a wireless communication with the primary base station device PCell in the foregoing embodiments) via the wireless communication part while establishing a link so as to enable a wireless communication with the secondary base station device (i.e. SCell in the foregoing embodiments) via the wireless communication part; a primary base station link failure detector (i.e. the primary base station link failure detector 203 in the foregoing embodiments) configured to detect a radio link failure (i.e. RLF in the foregoing embodiments) status in the wireless communication with the primary base station device based on the predetermined condition; and a primary base station link failure information transmitter (i.e. the primary base station link failure information transmitter 205 in the foregoing embodiments) configured to wirelessly transmit information, concerning a radio link failure with the primary base station device, via the wireless communication part when the primary base station link failure detector detects the radio link failure status.

A terminal device includes: a wireless communication part configured to wirelessly communicate with base station devices; a link controller configured to establish a link so as to enable a wireless communication with the primary base station device via the wireless communication part while establishing a link so as to enable a wireless communication with the secondary base station device via the wireless communication part; a secondary base station link failure detector (i.e. the secondary base station link failure detector 202 in the foregoing embodiments) configured to detect a radio link failure status in the wireless communication with the secondary base station device based on the predetermined condition; and a secondary base station link failure information transmitter (i.e. the secondary base station link failure information transmitter 204 in the foregoing embodiments) configured to wirelessly transmit information, concerning a radio link failure with the secondary base station device, to the primary base station device via the wireless communication part when the secondary base station link failure detector detects the radio link failure status.

A base station device (i.e. the macro base station devices 1-1, 1-2 and the small cell base station devices 2-1 to 2-3 in the foregoing embodiments) includes: a wireless communication part (i.e. the wireless communication parts 122, 142 in the foregoing embodiments) configured to wirelessly communicate with a terminal device; a storage unit (i.e. the storage units 124, 144 in the foregoing embodiments) configured to store information concerning the terminal device which is connected thereto to enable a wireless communication; and a first storing information controller (i.e. the first storing information controllers 301, 401 in the foregoing embodiments) configured to erase a part or the entirety of the information, concerning the terminal device, stored in the storage unit when the wireless communication part receives information concerning a radio link failure with a primary base station device which is wirelessly transmitted by the terminal device which is connected to the local device (or the present device), acting as a secondary base station device, so as to enable a wireless communication.

The base station device further includes: a communication part (i.e. the communication parts 123, 143 in the foregoing embodiments) configured to communicate with another base station device, and a primary base station link failure information transmitter (i.e. the primary base station link failure information transmitters 302, 402 in the foregoing embodiments) configured to transmit information concerning a radio link failure with the primary base station device to the primary base station device via the communication part when the wireless communication part receives the information concerning the radio link failure with the primary base station device which is wirelessly transmitted by the terminal device which is connected to the local device (or the present device), acting as the secondary base station device so as to enable a wireless communication.

A base station device includes: a wireless communication part configured to wirelessly communicate with a terminal device; a storage unit configured to store information concerning the terminal device which is connected thereto so as to enable a wireless communication; a communication part configured to communicate with another base station device; and a secondary base station link failure information transmitter (i.e. the secondary base station link failure information transmitters 303, 403 in the foregoing embodiments) configured to transmit information concerning a radio link failure with a secondary base station device to the secondary base station device via the communication part when the wireless communication part receives the information concerning the radio link failure with the secondary base station device which is wirelessly transmitted by the terminal device which is connected to the local device (or the present device), acting as the primary base station device, so as to enable a wireless communication.

The base station device further includes: a second storing information controller (i.e. the second storing information controllers 304, 404 in foregoing embodiments) configured to erase a part or the entirety of the information, concerning the terminal device, which is stored in the storage unit when the communication part receives the information, concerning the radio link failure between the terminal device and the local device (or the present device), which is transmitted by another base station device.

A communication system (i.e. the communication system shown in FIG. 1 in the foregoing embodiments) including a terminal device and a plurality of base station devices is characterized in that the terminal device establishes a link with the primary base station device so as to enable a wireless communication while establishing a link with the secondary base station device so as to enable a wireless communication, wherein when the terminal device detects a radio link failure status in a wireless communication with the primary base station device (or the secondary base station device) based on the predetermined condition, the terminal device wirelessly transmits information, concerning the radio link failure with the primary base station device (or the secondary base station device), to the secondary primary base station device (or the secondary base station device).

A communication method (i.e. the communication method implemented by the communication system shown in FIG. 1 in the foregoing embodiments) is characterized in that a terminal device establishes a link with a primary base station device so as to enable a wireless communication while establishing a link with a secondary base station device so as to enable a wireless communication, wherein upon detecting a radio link failure status in a wireless communication with the primary base station device (or the secondary base station device), the terminal device wirelessly transmits information, concerning the radio link failure with the primary base station device (or the secondary base station device), to the secondary base station device (or the primary base station device).

The foregoing embodiments of the present invention are described in detail with reference to the drawings, whereas the concrete configurations are not necessarily limited to the foregoing embodiments; hence, the present invention may embrace various design changes without departing from the subject matter of the present invention.

It is possible to store programs, achieving the functions of devices mobile terminal devices and base station devices) according to the foregoing embodiments, in computer-readable storage media, and therefore it is possible to load programs stored in storage media into a computer system, which in turn executes programs so as to carry out processing.

The aforementioned "computer system" may embrace operating systems (OS) and hardware such as peripheral devices.

The "computer-readable storage media" refer to flexible disks, magneto-optic disks, ROM (Read-Only Memory), rewritable non-volatile memory such as flash memory, portable media such as DVD (Digital Versatile Disk), and storage units such as hard-disk units installed in each computer system.

Additionally, "computer-readable storage media" may refer to any measures retaining programs for a certain time, such as non-volatile memory (e.g. DRAM (Dynamic Random Access Memory)) installed in each computer system serving as a server or a client storing programs transmitted through networks such as the Internet and communication lines such as telephone lines.

The above programs may be transmitted from a computer system having a storage unit storing programs to another computer system through transmission media or by use of transmission waves propagating through transmission media. Herein, "transmission media" used to transmit programs refer to any media having functions to transmit information, like networks (or communication networks) such as the Internet and communication lines such as telephone lines.

Additionally, the above programs may achieve part of the foregoing functions. Moreover, the above programs may be drafted as differential files (or differential programs) which are combined with programs pre-installed in each computer system so as to achieve the foregoing functions.

REFERENCE SIGNS LIST 1, 1-2, 1001-1 . . . macro base station device
2, 2-1 to 2-3, 1002-1 . . . small cell base station device
11-1 to 11-2, 12-1 to 12-3, 1011-1, 1012-1 . . . cell (communication area)
21, 21-1, 1021-1 . . . mobile terminal device
101, 121, 141 . . . antenna
107, 177, 142 . . . wireless communication part
103 . . . input part
104 output part
105, 124, 144 . . . storage unit
106, 125, 145 . . . controller
123, 143 . . . communication part
201 . . . link controller
202 . . . secondary base station link failure detector
203 . . . primary base station link failure detector
204, 303, 403 . . . secondary base station link failure information transmitter
205, 302, 402 . . . primary base station link failure information transmitter
301, 401 . . . first storing information controller
304, 404 . . . second storing information controller

The invention claimed is:

1. A terminal device connectable to a primary base station device through a control plane and a secondary base station through a user plane, the terminal device comprising:
   a wireless communication part configured to wirelessly communicate with the primary base station device and the secondary base station device;
   a link controller configured to establish a radio link with the primary base station device using a first identifier and the secondary base station device using a second identifier via the wireless communication part;
   a primary base station link failure detector configured to detect a primary radio link failure with the primary base station device under a primary failure condition which is determined in advance;
   a primary base station link failure information transmitter configured to wirelessly transmit primary failure information indicating the first identifier concerning the primary radio link failure with the primary base station device via the wireless communication part;
   a secondary base station link failure detector configured to detect a secondary radio link failure with the secondary base station device under a secondary failure condition which is determined in advance; and
   a secondary base station link failure information transmitter configured to wirelessly transmit secondary failure information indicating the second identifier concerning the secondary radio link failure with the secondary base station device to the primary base station device via the wireless communication part.

2. A communication system comprising:
   a terminal device;
   a primary base station device connectable to the terminal device through a control plane with setting a first identifier for the terminal device; and
   a secondary base station device connectable to the terminal device through a user plane with setting a second identifier for the terminal device,
   wherein, when the terminal device detects a radio link failure with the primary base station device, the terminal device transmits primary failure information indicating the first identifier of the terminal device to the secondary base station device; the secondary base station device retransmits the primary failure information to the primary base station device; thus, the primary base station device releases management information concerning the terminal device, and
   wherein, when the terminal device detects a radio link failure with the secondary base station device, the terminal device transmits secondary failure information indicating the second identifier of the terminal device to the primary base station device; the primary base station device retransmits the secondary failure information to the secondary base station device; thus, the secondary base station device releases management information concerning the terminal device.

3. A communication method adapted to a terminal device connectable to a primary base station device through a control plane and a secondary base station device through a user plane, the communication method comprising:
   establishing a radio link with the primary base station device setting a first identifier for the terminal device and the secondary base station device setting a second identifier for the terminal device
   upon detecting a radio link failure between the terminal device and the primary base station device, transmitting primary failure information indicating the first identifier of the terminal device from the terminal device to the secondary base station device; retransmitting the primary failure information from the secondary base station device to the primary base station device, thus releasing management information concerning the terminal device; and
   upon detecting a radio link failure between the terminal device and the secondary base station device, transmitting secondary failure information indicating the second identifier of the terminal device from the terminal device to the primary base station device; retransmitting the secondary failure information from the primary base station device to the secondary base station device, thus releasing management information concerning the terminal device.

4. The terminal device according to claim 1, wherein each of the first and second identifiers refers to a terminal management number.

* * * * *